United States Patent [19]

Groth

[11] 4,327,967
[45] May 4, 1982

[54] HEAT-REFLECTING PANEL HAVING NEUTRAL-COLOR OUTER APPEARANCE

[75] Inventor: Rolf Groth, Bochum-Wattenscheid, Fed. Rep. of Germany

[73] Assignee: BFG Glassgroup, Paris, France

[21] Appl. No.: 158,481

[22] Filed: Jun. 11, 1980

[30] Foreign Application Priority Data

Jun. 20, 1979 [DE] Fed. Rep. of Germany ....... 2924833

[51] Int. Cl.³ .............................................. G02B 17/00
[52] U.S. Cl. ..................................... 350/258; 52/789;
52/171; 350/1.7; 350/166; 428/623; 428/630;
428/632; 428/661; 428/666; 428/672; 428/678;
428/926
[58] Field of Search ............... 428/469, 472, 623, 630,
428/632, 639, 661, 666, 672, 680, 660, 678, 926;
126/901; 350/1.1, 1.6, 1.7, 314, 256, 164, 166,
259, 260, 264, 265, 258; 52/171, 172, 789;
49/390

[56] References Cited

U.S. PATENT DOCUMENTS 3,476,594  11/1969  Soderberg .......................... 428/672
3,516,720   6/1970  Mauer ................................... 350/1
3,901,997   8/1975  Groth ................................ 428/469
3,978,273   8/1976  Groth ................................ 350/1.7
4,235,048  11/1980  Gillery .............................. 428/469

FOREIGN PATENT DOCUMENTS 2029181  12/1971  Fed. Rep. of Germany .
1317368   5/1973  United Kingdom .

Primary Examiner—Michael L. Lewis
Attorney, Agent, or Firm—Parmelee, Miller, Welsh & Kratz

[57] ABSTRACT

A heat-reflecting panel having a neutral-color outer appearance has a transparent film support, such as a glass pane, an interference film having a refractive index >2 disposed on the support, a heat reflecting gold film of a thickness of 70–105 Å disposed on the side of the interference film remote from the support, and neutralization film formed from chromium, iron, nickel, titanium or alloys thereof, or an alloy of chromium, aluminium and iron, the neutralization film disposed on the side of the gold film remote from the interference film.

7 Claims, 1 Drawing Figure

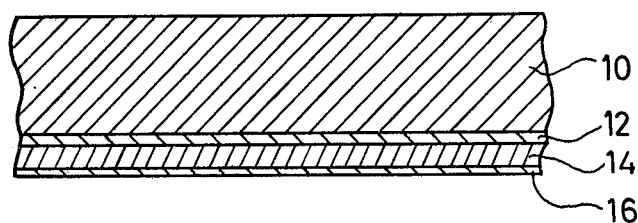

HEAT-REFLECTING PANEL HAVING NEUTRAL-COLOR OUTER APPEARANCE

BACKGROUND OF THE INVENTION

The invention relates to a heat-reflecting panel, more particularly a heat-reflecting window-pane having a neutral-color external appearance, comprising a transparent film support, an interference film of dielectric material having a refractive index >2 disposed on the support, and a heat-reflecting gold film disposed on the side of the interference film remote from the transparent film support.

There is an increasing need, particularly in the glazing of buildings, for window-panes having good sunshading properties, i.e. minimum transmission of the total solar radiation combined with maximum transmission of visible light, the panes having a neutral-color external appearance and the same visual reflectivity as window-panes made of transparent glass. In some cases, only some of the rooms of a building (e.g. air-conditioned rooms for computer installations) have to be equipped with heat-reflecting panes, whereas all other rooms can be glazed with normal window glass, i.e. transparent glass. In such cases, it is desirable that the heat-reflecting panes should give the same outward visual reflection as transparent glass, so that the outside of the building presents a harmonious general appearance. The same frequently applies to buildings which are entirely equipped with the aforementioned heat-reflecting panels, if the panels have to match their surroundings (e.g. high density development in an old city).

Gold films have been found particularly serviceable as coatings for heat-reflecting panels, because they are chemically very stable and have a light transmittance below about 50%—i.e. good sunshading properties. These gold films, however, have a strongly shaded external appearance and are therefore unsuitable for the aforementioned applications. The thickness of the gold film can be reduced until the coated panels have a neutral-color external appearance and a low visible reflection, but the films are then so thin that they lose most of their sunshading properties.

In this connection an improvement is obtained by using a heat-reflecting panel of the kind in question, wherein an interference film of dielectric material having a refractive index >2 is disposed between the gold film and the transparent film support (usually a silicate glass pane), because the two-film system, i.e. the interference film and the gold film can slightly extend the range of neutral-color, low visual reflections towards thicker gold films having a better sunshading effect. However, this is unsufficient for most applications. A visual reflection which is just neutral in color (when the panel is looked at from the glass side, i.e. from the outside when the window-pane is installed) is obtained if the gold film is 70 Å thick.

The following technical data apply to a heat-reflecting prior art panel of the aforementioned kind, made of transparent glass with a 70 Å thick gold film and a zinc sulphide interference film having a high index of refraction, disposed between the glass support and the gold film:

| | |
|---|---|
| Transmission of solar radiation | = 55% |
| Reflection of solar radiation | = 13% |
| (measured from the glass side) Light tansmittance (relative to the sensitivity of the human eye to brightness) | = 66.3% |
| Visual reflection (measured from the glass side) | = 8.2% |

The last-mentioned value is completely equivalent to the visual reflection factor (8%) of a single pane of transparent glass.

In many applications, however, it is necessary to further reduce the solar-radiation transmission coefficients of the aforementioned heat-reflecting panels. In most cases, to ensure effective sunshading, the transmission coefficient has to be less than 50%. If the thickness of the gold film in the prior-art heat-reflecting panel is increased for this purpose, it is impossible to obtain a neutral-color external appearance, even if an additional change is made in the thickness of the interference film. The reason is that, in the range of interference-film thicknesses in question, the color of the interference film changes, during the increase in thickness, from reddish violet to pale green, without any neutral-color region at the transition between these colors.

The object of the present invention, therefore, is to improve the prior-art heat-reflecting panel so as to increase the thickness of the gold film and reduce the transmission of solar radiation to below about 50% while retaining a neutral-color external appearance.

SUMMARY OF THE INVENTION

A heat-reflecting panel having a neutral-color outer appearance comprises a transparent film support, an interference film of dielectric material having a refractive index >2 disposed on the support, a heat reflecting gold film of a thickness of 70–105 Å disposed on the side of the interference film remote from the transparent film support, and a neutralization film, of a thickness of 8–60 Å, of chromium, iron, nickel, titanium or alloys thereof, or an alloy of chromium, aluminium and iron, the neutralization film disposed on the side of the gold film remote from the interference film. Preferably, the neutralization film comprises a chromium-nickel alloy containing 20 weight percent chromium and 80 weight percent nickel. Advantageously, a dielectric, adhesive intermediate film which absorbs practically no light and made of a material having a refractive index substantially the same as that of the transparent film support is disposed between the transparent film support and the interference film. Also, the films are preferably formed by vacuum deposition on the transparent film support.

BRIEF DESCRIPTION OF THE DRAWING

The drawing is a diagrammatic showing of an embodiment, in cross-section, of a heat-reflecting panel of the present invention.

DETAILED DESCRIPTION

Accordingly, in the heat-reflecting panel according to the invention, a neutralization film is disposed on the side of the gold film remote from the interference film and is preferably made of nickel, chromium, iron or titanium; alloys of these metals and alloys of chromium, iron and aluminium have also been found suitable. It is particularly advantageous, however, to use chromium-nickel alloys, as mentioned e.g. in German Patent Spec.

No. 20 29 181 as a material for the absorption film described therein.

As a result of the neutralization film according to the invention, a completely neutral-color visual reflection can be obtained from the glass side in the case of gold films more than 70 A thick in a system comprising a gold film and a highly refractive interference film. (When the heat-reflecting panel is used as a windowpane, it is of course incorporated so that the transparent film support is disposed at the outside of the building whereas the coating system is towards the interior). The reflection factor is also close to that for a single transparent glass pane. However, the thickness range of gold films in which this "color neutrality effect" occurs is limited to films up to about 105 A thick. Thicker gold films cannot be made neutral in color by the additional neutralization film, even if the thickness of the interference film is changed to match.

A particularly advantageous feature is that the color neutrality of the heat-reflecting panel, according to the invention, is obtained with a simultaneous increase in the thickness of the gold film. This thickening is advantageous for two reasons. Firstly, there is a more favorable ratio between the light transmittance and the transmission of total solar radiation, owing to the selective filter properties of the gold film (high transmission in the visible spectral region as against lower transmission and high reflection in the near infrared). In addition, even the proportion absorbed by the panel and the resulting heating thereof can be limited, in contrast to a method in which e.g. the transmission of solar radiation is reduced by the use of only absorbent glass or absorbent films. As a result of the increased thickness of the gold film, there is also an increase in the infrared reflectivity on the side of the coating system, in the case of heat radiation, i.e. wavelengths >4 μm. This further reduces the exchange of radiation between the panel and the interior or a second, transparent glass pane disposed inwardly of the heat-reflecting panel according to the invention (e.g. for insulation purposes), and thus improves the heat insulation (the k coefficient).

The fact that the neutralization film according to the invention can achieve color neutrality in the case of gold films between 70 and 105 A thick is surprising, since the metal or metal alloys used in the neutralization films have absorption which is practically independent of wavelengths in the visible region of the spectrum, i.e. they uniformly attenuate transmitted radiation. It is also surprising that very thin neutralization films (about 10 A) are sufficient for the "color neutrality effect". The absorption coefficients of films having the aforementioned thickness are about 10%, so that they do not undesirably reduce the transmission (i.e. the light transmittance) of the total film system.

The skilled addressee could not foresee the synergist effect obtained according to the invention by the combination of the claimed neutralization film with the thicker gold film. Admittedly, German patent Spec. No. 20 29 181 discloses the use of an absorption film disposed between the glass pane and e.g. a heat-reflecting gold film and made of a material corresponding to that of the neutralization film according to the invention, but the citation contains no suggestion regarding the mode of action of the neutralization film according to the invention in combination with an interference film, more particularly a zinc sulphide film, disposed on the opposite side of the heat-reflecting gold film. U.S. Pat. No. 3,476,594 describes a film system in which a nickel film and a gold film are successively disposed on a transparent film support, i.e. a glass pane, but this structure does not correspond to that according to the invention, in which a neutralization film, made e.g. of chromium-nickel alloy, is disposed on the side remote from the glass pane of a two-film system comprising an interference film and a gold film. German AS No. 19 11 036 relates to the use of metal, semi-metal or metal-alloy films in conjunction with an interference system in which e.g. a gold film is embedded in interference films on both sides. The results are completely different from the heat-reflecting panel according to the invention. Finally, SA-PS No. 76 03-269 discloses the production of a pink shade, using copper as the heat-reflecting metal film, by coating the film with an additional metal or metal-alloy film made of a material similar to the neutralization film according to the invention. The last-mentioned publication does not suggest that a synergist effect can be obtained in the present described manner by using a neutralization film disposed in the system according to the invention in combination with a gold film.

In a specially preferred embodiment of the invention, the neutralization film comprises a chromium-nickel alloy containing 20 wt. % chromium and 80 wt. % nickel. Particularly good results have been obtained by manufacturing at least the neutralization film and preferably all the films by vacuum deposition on the transparent film support. It is also advantageous to dispose a dielectric, adhesive intermediate film, which absorbs practically no visible light, between the transparent film support and the interference film (of zinc sulphide in the present case), the intermediate film being made of a material having a refractive index substantially the same as that of the transparent film support, as disclosed e.g. in German AS No. 22 03 943.

An embodiment of the invention will now be described in detail with reference to the drawing.

The single diagrammatic drawing shows an embodiment, in cross-section, of a heat-reflecting panel according to the invention.

As the drawing shows, an interference film 12, made of zinc sulphide in the illustrated example, is disposed on a transparent film support 10, i.e. a transparent glass pane. A heat-reflecting gold film 14 is placed next, followed by a neutralization film 16 made of chromium-nickel alloy containing 80% nickel and 20% chromium.

The panel shown in the drawing was manufactured as follows: First, the zinc sulphide interference film 12 was vapour-deposited on a transparent glass pane 4 mm thick in a high-vacuum evaporator at a pressure of $5 \times 10^{-5}$ Torr. Next, the gold film 14 (93 A thick) and the neutralization film 16 (13 A thick) were successively deposited. The resulting heat-reflecting panel had the following properties:

| | |
|---|---|
| Transmission of solar radiation | = 44% |
| Reflection of solar radiation (measured from the glass side) | = 18% |
| Light transmittance (relative to the sensitivity of the human eye to brightness) | = 57% |
| Visual reflection (measured from the glass side) | = 8.7% |

When seen from the glass side, the panel is neutral in color and has substantially the same optical effect as a single uncoated transparent glass pane 10.

A comparison between the technical data of the previously-described heat-reflecting prior art panel having an interference film and 70 A thick gold film and a corresponding neutral-color panel, of the present invention shows that the thicker gold film used in the panel according to the invention considerably improves the selectivity, i.e. the ratio of light transmittance to transmission of solar radiation. The improvement is from $(66.3/55) = 1.21$ to $(57/44) = 1.30$. In addition, the reflection of solar radiation also increases from 13% to 18%. This means that the pane according to the invention is less strongly heated by solar radiation than in the case of other devices, in which the transmission of solar radiation is restricted to less than 50% but exclusively by absorption. There is thus a small risk of fracture through faults caused by heating. Another advantage of using a thicker gold film is that, owing to the increased reflection of heat radiation (wavelength region $>4$ μm) by the thicker film, there is also a considerable reduction in the exchange of radiation between the coated side and the interior or a second internal glass pane, i.e. there is a considerable improvement in the heat-insulation coefficient k. For example, the effective emission capacity at right angles to the surface decreases from 0.18 for a prior art gold film 70 A thick to about 0.11 in the case of the film in the present example.

In a further embodiment, a dielectric intermediate film of material (not shown), which absorbs practically no visible light, is disposed between the transparent film support 10, and the interference film 12, the intermediate film being formed of a material having a refractive index substantially the same as that of the transparent film support. The intermediate film may comprise silicon oxide or glass, and is of a thickness considerably smaller than the wavelength of visable light.

The heat reflecting panel may also be used in an insulating panel such as those formed of spaced transparent sheets. Such an insulating panel would include a glass pane positioned in spaced relation to the heat-reflecting panel of the present invention, with the insulating panel installed in a building, or the like, with the heat-reflecting panel thereof exposed at the exterior of the building.

I claim:

1. In a heat reflecting panel having a neutral color external appearance and having a transparent film support, an interference film of dielectric material with a refractive index >2 placed upon said transparent film support and a heat reflecting gold coating placed on the side of the interference film remote from said transparent film support, the improvement wherein said gold coating has a thickness between 70 and 105 A and a neutralization film is provided on the side of said gold film remote from the interference film, said neutralization film having a thickness of between about 8 and 60 A and comprising a material selected from the group consisting of chromium, iron, nickel, titanium, alloys of the aforementioned metals, and an alloy of the metals chromium, aluminum and iron.

2. The heat reflecting panel according to claim 1 wherein the neutralization film comprises a chromium-nickel alloy containing 20% by weight chromium and 80% by weight nickel.

3. The heat reflecting panel according to claim 2 wherein the thickness of the neutralization film is 13 Å.

4. The heat reflecting panel according to claim 1 or 3 wherein the thickness of the gold film is 93 Å.

5. The heat reflecting panel according to claim 1 wherein the interference film is formed from zinc sulfide.

6. The heat reflecting panel according to claim 5 wherein a dielectric adhesive film of a metal oxide which is substantially absorption-free for visible light and has a thickness significantly smaller than the wavelength of light is provided between the transparent film support and the zinc sulphide interference film.

7. The heat reflecting panel according to claim 1 in combination with a multiple panel arrangement for installation in a building, said multiple panel arrangement having an inside panel and an outside panel relative to the interior and the exterior of the building, wherein said heat reflecting panel is the outside panel of said multiple panel arrangement.

* * * * *